United States Patent
Sun et al.

(10) Patent No.: US 12,408,048 B2
(45) Date of Patent: Sep. 2, 2025

(54) METHOD FOR A TRANSMISSION/RECEPTION POINT (TRP) SPECIFIC BEAM FAILURE RECOVERY (BFR) FOR A SINGLE DOWNLINK CONTROL INFORMATION (DCI) MODE

(71) Applicant: Apple Inc., Cupertino, CA (US)

(72) Inventors: Haitong Sun, Cupertino, CA (US); Wei Zeng, Saratoga, CA (US); Huaning Niu, San Jose, CA (US); Hong He, San Jose, CA (US); Chunxuan Ye, San Diego, CA (US); Seyed Ali Akbar Fakoorian, San Diego, CA (US); Oghenekome Oteri, San Diego, CA (US); Dawei Zhang, Saratoga, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/442,059

(22) PCT Filed: May 11, 2021

(86) PCT No.: PCT/CN2021/093124
§ 371 (c)(1),
(2) Date: Nov. 17, 2022

(87) PCT Pub. No.: WO2022/236708
PCT Pub. Date: Nov. 17, 2022

(65) Prior Publication Data
US 2024/0073707 A1 Feb. 29, 2024

(51) Int. Cl.
*H04W 24/04* (2009.01)
*H04W 76/34* (2018.01)
(Continued)

(52) U.S. Cl.
CPC ........... *H04W 24/04* (2013.01); *H04W 76/34* (2018.02); *H04W 76/38* (2018.02); *H04W 88/06* (2013.01)

(58) Field of Classification Search
CPC ..... H04W 24/04; H04W 76/34; H04W 76/38; H04W 88/06; H04W 72/046;
(Continued)

(56) References Cited

U.S. PATENT DOCUMENTS

| | | | |
|---|---|---|---|
| 2020/0100311 A1 | 3/2020 | Cirik et al. | |
| 2020/0344729 A1 | 10/2020 | Park et al. | |

(Continued)

FOREIGN PATENT DOCUMENTS

| | | |
|---|---|---|
| CN | 110351112 A | 10/2019 |
| CN | 112514314 A | 3/2021 |

(Continued)

OTHER PUBLICATIONS

U.S. Appl. No. 63/085,141, filed Sep. 29, 2020 (Year: 2020).*
(Continued)

*Primary Examiner* — Sun Jong Kim
(74) *Attorney, Agent, or Firm* — Sterne, Kessler, Goldstein & Fox P.L.L.C.

(57) ABSTRACT

Aspects are described for a user equipment (UE) comprising a transceiver and a processor communicatively coupled to the transceiver. The UE is in a multi-TRP mode. The processor is configured to receive a configuration message, a BFD configuration, and a BFR configuration. The UE switches to a single-TRP mode upon receiving the configuration message. The processor is further configured to update a first BFD procedure based on the BFD configuration and update a first BFR procedure based on the BFR configuration. Finally, the processor is configured to perform the updated first BFD procedure and the updated first BFR (Continued)

procedure for the first TRP responsive to a result of the updated first BFD procedure.

13 Claims, 9 Drawing Sheets

(51) Int. Cl.
*H04W 76/38* (2018.01)
*H04W 88/06* (2009.01)

(58) Field of Classification Search
CPC ...... H04W 24/08; H04W 72/23; H04B 7/024; H04B 7/0695; H04B 7/06964; H04B 7/0413; H04L 5/0053; H04L 5/0091; H04L 5/0044; H04L 5/0023; H04L 5/0048

See application file for complete search history.

(56) References Cited

U.S. PATENT DOCUMENTS

| 2023/0053871 A1* | 2/2023 | Tran | H04B 7/0408 |
| 2023/0345570 A1* | 10/2023 | Fan | H04B 7/06964 |
| 2023/0353224 A1* | 11/2023 | Jia | H04W 24/10 |
| 2024/0349090 A1* | 10/2024 | Zhou | H04W 36/085 |

FOREIGN PATENT DOCUMENTS

| EP | 3 855 661 A1 | 7/2021 |
| WO | WO 2020/057665 A1 | 3/2020 |

OTHER PUBLICATIONS

International Search Report and Written Opinion of the International Searching Authority directed to related International Patent Application No. PCT/CN2021/093124, mailed Feb. 7, 2022; 9 pages.
Samsung: "Enhancements on beam management for multi-TRP," 3GPP Draft; R1-2008151, 3GPP TSG RAN WG1 #103, e-Meeting; 8 pages.
International Preliminary Report on Patentability directed to related International Patent Application No. PCT/CN2021/093124, issued Nov. 14, 2023; 5 pages.
Partial Supplementary European Search Report directed to related European Patent Application No. 21941283.0, mailed Jun. 26, 2024; 16 pages.
Extended European Search Report directed to related European Patent Application No. 21941283.0, mailed Sep. 16, 2024; 15 pages.
Vivo, "Further discussion on MTRP multibeam enhancement," 3GPP Draft, R1-2102509, 3GPP TSG RAN WG1 #104b-e, e-Meeting, Apr. 12, 2021; 12 pages.
Nokia et al., "Enhancements for HST-SFN deployment," 3GPP Draft, R1-2103369, 3GPP TSG RAN WG1 #104bis-e, e-Meeting, Apr. 12, 2021; 15 pages.
CATT, "Discussion on beam management enhancements for multi-TRP," 3GPP TSG RAN WG1 #104b-e, e-Meeting, Apr. 12-20, 2021, R1-2102601; 11 pages.
ZTE, "Enhancements on beam management for multi-TRP," 3GPP TSG RAN WG1 Meeting #104b-e, e-Meeting, Apr. 12-20, 2021, R1-2102663; 18 pages.
InterDigital, Inc., Discussion on M-TRP Beam Management Enhancements, 3GPP TSG RAN WG1 #104-e, e-Meeting, Jan. 25-Feb. 5, 2021, R1-2100066; 6 pages.
Sony, "Considerations on beam management for multi-TRP," 3GPP TSG RAN WG1#103e, E-meeting, Oct. 26-Nov. 13, 2020, R1-2008349; 8 pages.
First Office Action and Search Report directed to related Chinese Application No. 202210505126.9, with English-language machine translation attached, mailed Mar. 25; 20 pages.
Vivo, "Further discussion on MTRP multibeam enhancement," 3GPP TSG RAN WG1 #103-e, e-Meeting, Oct. 26-Nov. 13, 2020, R1-2007647; 8 pages.
Huawei et al., "femimo_item2c_mtrp_bm_company_tdoc_summary," Apr. 9, 2021; 17 pages.

* cited by examiner

METHOD FOR A TRANSMISSION/RECEPTION POINT (TRP) SPECIFIC BEAM FAILURE RECOVERY (BFR) FOR A SINGLE DOWNLINK CONTROL INFORMATION (DCI) MODE

BACKGROUND

Field

The described aspects generally relate to an enhancement on a beam failure recovery for a single downlink control information (DCI) mode.

SUMMARY

Some aspects of this disclosure relate to apparatuses and methods for implementing a beam failure recovery (BFR) enhancement for a single downlink control information (DCI) mode for 3rd Generation Partnership Project (3GPP) release 15 (Rel-15), release 16 (Rel-16), release 17 (Rel-17), and/or other 3GPP releases that support the BFR. For example, systems and methods are provided for implementing a transmission/reception point (TRP) specific BFR.

Some aspects of this disclosure relate to a user equipment (UE) comprising a transceiver configured to enable wireless communication with a first transmission/reception point (TRP) and a second TRP and a processor communicatively coupled to the transceiver. The processor is configured to perform a first beam failure detection (BFD) procedure for the first TRP and second BFD procedure for the second TRP. The processor is further configured to perform a first beam failure recovery (BFR) procedure for the first TRP responsive to a result of the first BFD procedure and a second BFR procedure for the second TRP responsive to a result of the second BFD procedure. The processor is further configured to receive a configuration message, a BFD configuration, and a BFR configuration. The UE switches from a multi-TRP mode to a single-TRP mode upon receiving the configuration message. The processor is further configured to update the first BFD procedure based on the BFD configuration and update the first BFR procedure based on the BFR configuration. Finally, the processor is configured to perform the updated first BFD procedure and the updated first BFR procedure for the first TRP responsive to a result of the updated first BFD procedure.

Some aspects of this disclosure relate to a method of operating a UE to communicate with a first TRP and a second TRP. The method comprises performing a first BFD procedure for the first TRP and a second BFD for the second TRP. The method further comprises performing a first BFR procedure for the first TRP responsive to a result of the first BFD procedure and a second BFR procedure for the second TRP responsive to a result of the second BFD procedure. The method further comprises receiving a configuration message, a BFD configuration, and a BFR configuration, and switching from a multi-TRP mode to a single-TRP mode upon receiving the configuration message. The method further comprises updating the first BFD procedure based on the BFD configuration and updating the first BFR procedure based on the BFR configuration. Finally, the method comprises performing the updated first BFD procedure and the updated first BFR procedure for the first TRP responsive to a result of the updated first BFD procedure.

Some aspects of this disclosure relate to a base station comprising a transceiver configured to enable communication with a UE and a processor communicatively coupled to the transceiver. The processor is configured to generate a configuration message, a BFD configuration, and a BFR configuration. The processor is further configured to transmit the configuration message, the BFD configuration, and the BFR configuration to the UE.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
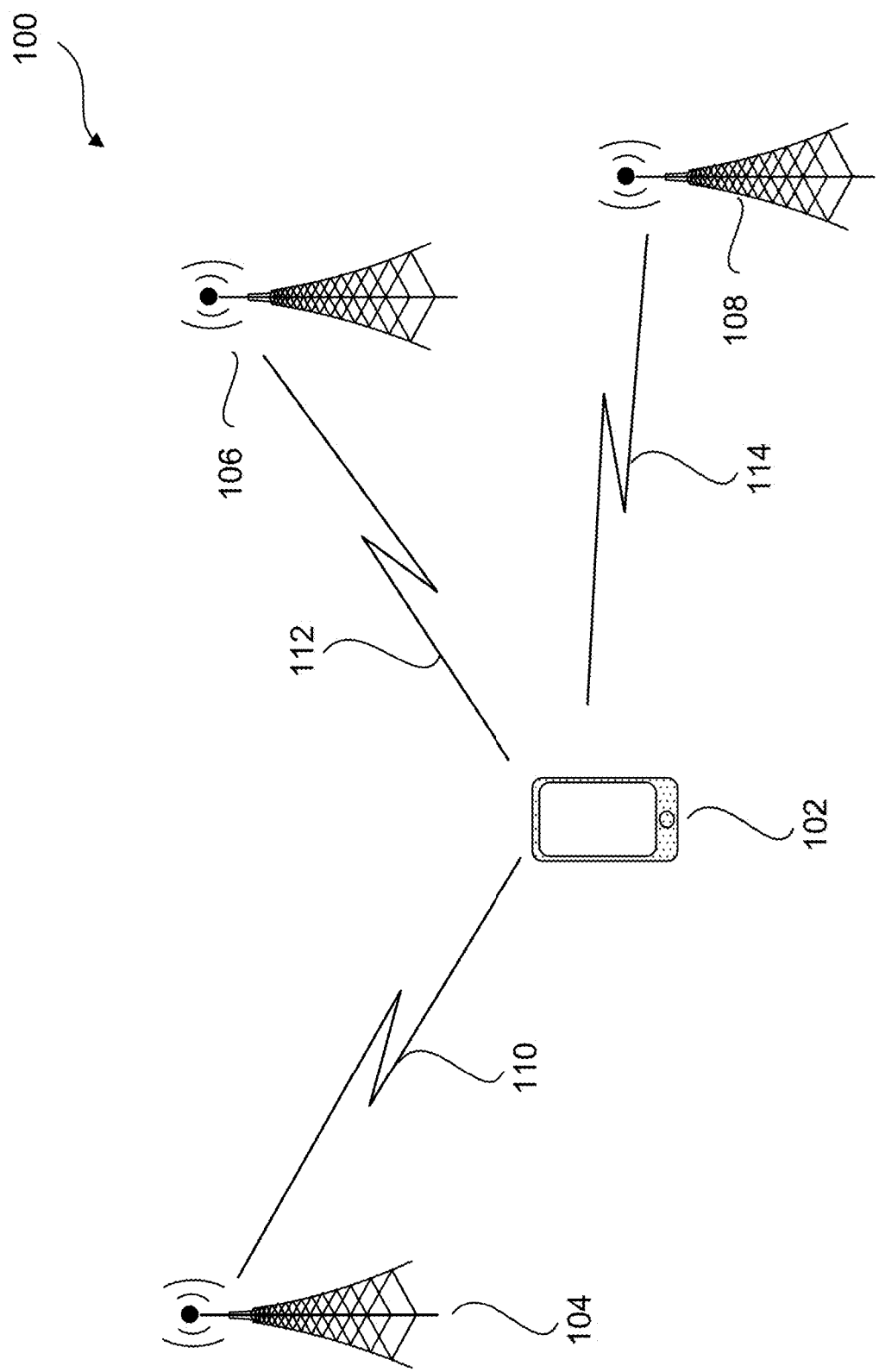
FIG. 1 illustrates an example system implementing a transmission/reception point (TRP) specific beam failure recovery (BFR), according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing a beam failure recovery (BFR) enhancement for a single downlink control information (DCI) mode for 3rd Generation Partnership Project (3GPP) release 15 (Rel-15), release 16 (Rel-16), release 17 (Rel-17), and/or other 3GPP releases. For example, systems and methods are provided for implementing designs for a transmission/reception point (TRP) specific BFR.

According to some aspects, a user equipment (UE) that operates according to Release 15 (Rel-15), Release 16

(Rel-16), and/or Release 17 (Rel-17) and/or New Radio (NR) of $5^{th}$ generation (5G) wireless technology for digital cellular networks as defined by 3GPP, and the UE can support a UE-specific BFR. For example, the UE connects with a first TRP via one or more beams. The one or more beams correspond to one or more control resource sets (CORESETs). The UE performs a beam failure detection (BFD) procedure of the first TRP. For example, the UE monitors and detects conditions of the one or more beams by detecting block error rates (BLERs) of one or more BFD reference signals (RSs) that are quasi co-located (QCLed) with the one or more CORESETs. In some aspects, the BFD RSs include synchronization signal block (SSB) signals and/or channel state information reference signals (CSI-RS). If the BLERs corresponding to a beam fall below a threshold, the UE detects a beam failure occurrence. In some aspects, the UE determines that the beam fails after detecting a predetermined number of beam fail occurrences of the beam. In some aspects, the UE declares a beam failure event after determines that all of the one or more beams fail. In such a case, the UE identifies a new candidate beam whose layer one reference signal received power (L1-RSRP) is above a power threshold. In some aspects, the UE performs a BFR procedure of the first TRP. For example, upon detecting the beam failure event, the UE reports the beam failure event and the new candidate beam to a base station via a beam failure recovery request (BFRQ). In some aspects, the base station is the first TRP. The UE may transmit the BFRQ via a MAC control element (MAC CE) or via a contention-based random access (CBRA). The base station then sends a beam failure recovery response (BFRR) to the UE to reconnect with the first TRP based on the new candidate beam. In some aspects, the base station transmits the BFRR via a transmission scheduled via a physical downlink control channel (PDCCH) to the UE. The PDCCH uses a same hybrid automatic repeat request (HARQ) process as a physical uplink shared channel (PUSCH) corresponding to the MAC CE. In some aspects, if the base station receives the BFRQ via the CBRA from the UE, the base station transmits the BFRR via the fourth message (Msg4) to the UE. In other words, the base station transmits the BFRR via a PDCCH that is associated with a cell-radio network temporary identifier (C-RNTI) corresponding to the UE.

According to some aspects, the UE also connects with a second TRP. In some aspects, the UE operates in a single-DCI mode, where the base station schedules physical downlink shared channels (PDSCHs) of both the first and second TRPs via a single DCI. The single-DCI mode is also referred to as a multi-TRP mode. In some aspects, the UE operates in a multi-DCI mode, where the base station schedules a PDSCH of the first TRP via a first DCI and schedules a PDSCH of the second TRP via a second DCI. In some aspects, the UE can perform a TRP-specific BFR for the first and the second TRPs. For example, the UE performs separate BFD and BFR procedures for the first and the second TRPs.

In some aspects, the UE can switch from the multi-TRP mode to a single-TRP mode. For example, the UE determines to drop the second TRP by refraining from communicating user data to and from the second TRP. The UE may determine to drop the second TRP based on a data traffic condition, such as a packet arrival rate. The UE may also determine to drop the second TRP for power efficiency or other reasons. In some aspects, the base station instructs the UE to switch between the multi-TRP mode and the single-TRP mode. For example, the base station transmits a MAC CE to the UE to instruct the UE which mode the UE should be in: the multi-TRP mode or the single-TRP mode. In some aspects, the MAC CE transmitted by the base station includes a transmission configuration indicator (TCI). The UE may determine that a code-point of the TCI maps to two TCI states and switch to the multi-TRP mode. On the other hand, the UE may determine that the code-point of the TCI maps to one TCI state and switch to the single-TRP mode.

FIG. 1 illustrates an example system 100 implementing designs of a TRP-specific BFR, according to some aspects of the disclosure. Example system 100 is provided for the purpose of illustration only and does not limit the disclosed aspects. System 100 may include, but is not limited to, a UE 102, a TRP 104, a TRP 106, and a TRP 108. The UE 102 may be implemented as electronic devices configured to operate based on a wide variety of wireless communication techniques. These techniques may include, but are not limited to, techniques based on 3rd Generation Partnership Project (3GPP) standards. For example, the UE 102 may include electronic devices configured to operate using one or more 3GPP releases, such as Release 15 (Rel-15), Release 16 (Rel-16), Release 17 (Rel-17), or other 3GPP releases. The UE 102 may include, but is not limited to, wireless communication devices, smartphones, laptops, desktops, tablets, personal assistants, monitors, televisions, wearable devices, Internet of Things (IoT) devices, vehicle communication devices, and the like. The TRPs 104, 106, and 108 may include one or more nodes configured to operate based on a wide variety of wireless communication techniques such as, but not limited to, techniques based on the 3GPP standards. For example, the TRPs 104, 106, and 108 may include nodes configured to operate using Rel-15, Rel-16, Rel-17, or other 3GPP releases. The TRPs 104, 106, and 108 may include, but not limited to, base stations, NodeBs, eNodeBs, gNBs, new radio base stations (NR BSs), access points (APs), remote radio heads, relay stations, and others.

In some aspects, the UE 102 connects with the TRP 104 via a communication link 110 and the TRP 106 via a communication link 112. Each of the communication links 110 and 112 includes one or more beams. As discussed above, the UE 102 is in a multi-TRP mode. In some aspects, the UE 102 can perform a TRP-specific BFR, which includes a BFD procedure and a BFR procedure for each of connected TRPs, e.g., the TRP 104 and the TRP 106. For example, the UE 102 performs a BFD procedure of the TRP 104 by monitoring the one or more beams of the communication link 110. The UE 102 declares a beam failure event of the TRP 104 when the UE 102 detects that the one or more beams of the communication link 110 fail. After the UE 102 declares the beam failure event of the TRP 104, the UE 102 performs a BFR procedure of the TRP 104. For example, the UE 102 generates a BFRQ of the TRP 104 identifying one or more new candidate beams and transmits the BFRQ of the TRP 104 to a base station. In some aspects, the base station is the TRP 108. The UE 102 transmits the BFRQ of the TRP 104 to the TRP 108 via a communication link 114. In other aspects, the base station is the TRP 104 or the TRP 106. For example, the UE 102 transmits the BFRQ of the TRP 104 to the TRP 106 via the communication link 112. The UE 102 can also transmit the BFRQ of the TRP 104 to the TRP 104 via channels other than the communication link 110 after declaring the beam failure event of the TRP 104. For example, the UE 102 can transmit the BFRQ of the TRP 104 to the TRP 104 via a contention-based random access procedure, such as a physical random access channel (PRACH). In some aspects, upon receiving the BFRQ of the TRP 104, the base station generates a BFRR of the TRP 104 and transmits the BFRR of the TRP 104 to the UE 102. The BFRR of the TRP 104 confirms the one or more new candidate beams. The BFRR of the TRP 104 may also deny the one or more new candidate beams and identify a different set of one or more new candidate beams. After receiving the BFRR of the TRP 104, the UE 102 completes the BFR procedure of the TRP 104 by recovering the communication link 110 via the one or more new candidate beams. In some aspects, the UE 102 repeats the transmission of the BFRQ of the TRP 104 to the base station if the UE 102 does not receive the BFRR of the TRP 104 within a predetermined retransmission time period.

In some aspects, the UE 102 performs a BFD procedure and a BFR procedure of the TRP 106 similarly as described above regarding the TRP 104. As discussed above, the UE 102 performs the TRP-specific BFR. Therefore, the UE 102 performs the BFD and BFR procedures of the TRP 104 regardless of conditions of the TRP 106. For example, the UE 102 can declare the beam failure event of the TRP 104 even when the UE 102 still communicates with the TRP 106 via the communication link 112. In other words, the TRP-specific BFR ensures that the UE 102 can communicate with both the TRP 104 and the TRP 106. In some aspects, when both communication links 110 and 112 fail, the UE 102 generates the BFRQ of the TRP 104 and a BFRQ of the TRP 106 and transmits both of the BFRQs to the base station. The base station, upon receiving the BFRQs, generates and transmits the BFRR of the TRP 104 and a BFRR of the TRP 106 to the UE 102 to instruct recovery of the communication links 110 and 112. The UE 102 performing the TRP-specific BFR is also referred to as in a TRP-specific mode.

In some aspects, the UE 102 can perform a UE-specific BFR or be in a UE-specific mode. In such as case, the UE 102 performs a BFD procedure for both the TRP 104 and the TRP 106. For example, UE 102 monitors the one or more beams of the communication link 110 and the one or more beams of the communication link 112. The UE 102 declares a beam failure event of the UE 102 when the one or more beams of the communication link 110 and the one or more beams of the communication link 112 fail. In other words, the UE 102 would not declare the beam failure event of the UE 102 if the UE 102 can still communicate with the TRP 104 or the TRP 106. For example, when the one or more beams of the communication link 110 fail but the one or more beams of the communication link 112 do not, the UE 102 would not declare the beam failure event of the UE 102. In some aspects, after the UE 102 declares the beam failure event of the UE 102, the UE 102 performs a BFR procedure of the UE 102. For example, the UE 102 generates a BFRQ of the UE 102 and then transmits the BFRQ of the UE 102 to the base station. In some aspects, the BFRQ of the UE 102 indicates one or more new candidate beams of the UE 102, which can be used to recover the communication link 110, the communication link 112, or both. The base station, upon receiving the BFRQ of the UE 102, generates and transmits a BFRR of the UE 102 to the UE 102. The BFRR of the UE 102 may confirm, deny, or indicate replacement of the one or more new candidate beams of the UE 102 as similarly discussed above. The BFRR of the UE 102 may also partially confirm the one or more new candidate beams of the UE 102. For example, the BFRQ of the UE 102 indicates a first beam and a second beam. The UE 102 can recover the communication link 110 using the first beam and recover the communication link 112 using the second beam. The BFRR of the UE 102 can confirm the first beam but deny the second beam. In other words, based on the BFRR of the UE 102, the UE 102 can recover the communication link 110, but not the communication link 112. In some aspects, the BFFR of the UE 102 confirms the second beam but denies the first beam, so that the UE 102 recovers the communication link 112, but not the communication link 110.

According to some aspects, the UE 102 switches from the multi-TRP mode to a single-TRP mode. For example, the UE 102 drops the TRP 104 by refraining from communicating user data to and from the TRP 104. In some aspects, the UE 102 updates the BFD and BFR procedures for the TRPs 104 and 106. For example, the UE 102 updates the BFD procedure of the TRP 104 to continue monitoring the communication link 112 but stop generating the BFRQ of the TRP 104. The UE 102 can also update the BFR to stop transmitting additional BFRQ if no BFRR is received within the predetermined retransmission time period. Details of updating the BFD and BFR procedures are disclosed below in FIG. 3. In some aspects, the UE 102 saves energy by updating the BFD and BFR procedures.

According to some aspects, the UE 102 can only be in one of the TRP-specific mode and the UE-specific mode at a given time for a component carrier. In other aspects, the UE 102 can be in both the TRP-specific mode and the UE-specific mode at the same time. In other words, the TRP-specific BFR and the UE-specific BFR may coexist. In some aspects, the UE 102 uses a set of BFD RSs for BFD procedures in both the TRP-specific mode and the UE-specific mode. In such a case, the UE 102 performs a constant BFD procedure based on the set of BFD RSs in both the multi-TRP mode and the single-TRP mode. For example, after the UE 102 switches to the single-TRP mode from the multi-TRP mode, the UE 102 continues the constant BFD procedure using the set of BFD RSs. In some aspects, the UE 102 detects a beam failure event based on the constant BFD procedure and determines a status of the beam failure event. For example, the communication link 110 includes a first and a second beams and the communication link 112 includes a third and a fourth beams. If the beam failure event indicates that the first and the second beams fail, the UE 102 determines that the status of the beam fail event to be a TRP-specific beam failure event of the TRP 104. In such as case, the UE 102 ignores the beam failure event if the UE 102 is in the single-TRP mode after dropping the TRP 104. On the other hand, the UE 102 performs a TRP-specific BFR of the TRP 104 if the UE 102 is in the multi-TRP mode. For example, the UE 102 generates and transmits the BFRQ of the TRP 104 to the base station. In some aspects, the beam failure event indicates that the first, the second, the third, and the fourth beams fail. The UE 102 determines that the status of the beam failure event to be a UE-specific beam failure event. In such a case, the UE 102 performs the BFR procedure of the UE 102 in the UE-specific mode or the BFR procedure of the TRP 104 and the BFR procedure of the TRP 106 in the TRP-specific mode. In some aspects, the base station instructs the UE 102 to perform the BFR procedure of the UE 102 or to perform the BFR procedure of the TRP 104 and the BFR procedure of the TRP 106. For example, the base station instructs the UE 102 by transmitting the MAC CE to the UE 102.

In some aspects, the UE 102 uses a first set of BFD RSs for the BFD procedures in the TRP-specific mode and a second set of BFD RSs for the BFD procedures in the UE-specific mode. In such a case, the UE 102 may detect a plurality of beam failure events. For example, the UE 102 may detect the UE-specific beam failure event of the UE 102 and the TRP-specific beam failure event of the TRP 104. The UE 102 may trigger a BFRQ based on priorities. For example, the UE-specific beam failure event of UE 102 has a high priority; the TRP-specific beam failure event of the TRP 104 has a medium priority; and the TRP-specific beam failure event of the TRP 106 has a low priority. Therefore, the UE 102 triggers the BFRQ procedure of the UE 102 in this case. In some aspects, the UE 102 triggers a plurality of BFRQs based on a capability of the UE 102.

Figure 2:
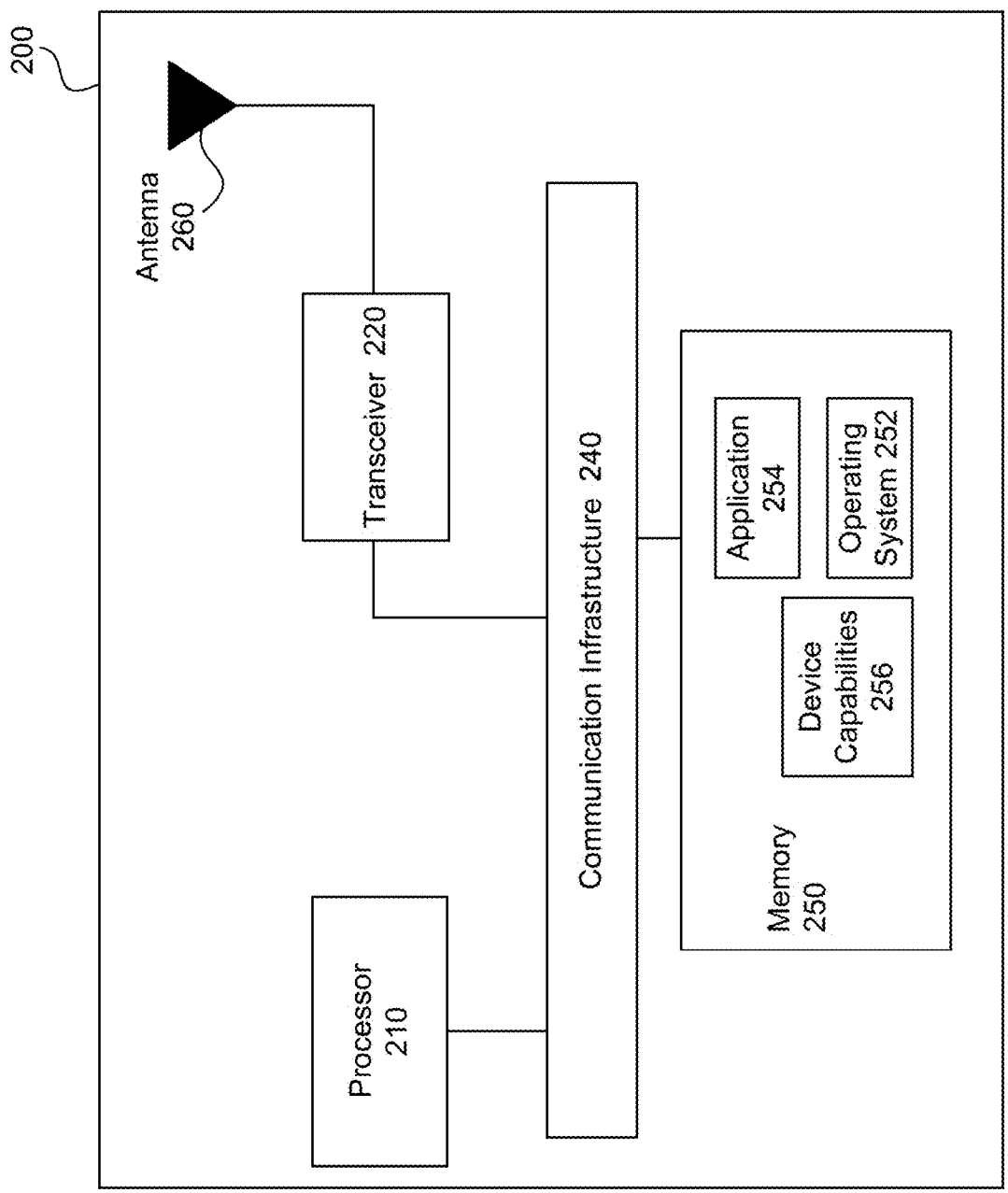
FIG. 2 illustrates a block diagram of an example system of an electronic device for the TRP-specific BFR, according to some aspects of the disclosure.

FIG. 2 illustrates a block diagram of an example system 200 of an electronic device implementing the TRP specific BFR, according to some aspects of the disclosure. The system 200 may be any of the electronic devices (e.g., the UE 102 and the TRPs 104, 106, and 108) of the system 100. The system 200 includes a processor 210, one or more transceivers 220, a communication infrastructure 240, a memory 250, an operating system 252, an application 254, and one or more antennas 260. Illustrated systems are provided as exemplary parts of system 200, and system 200 may include other circuit(s) and subsystem(s). Also, although the systems of system 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by wireless system 200 and/or a user of wireless system 200. The applications in the application 254 may include applications such as, but not limited to, Siri™, FaceTime™, radio streaming, video streaming, remote control, and/or other user applications.

The system 200 may also include the communication infrastructure 240. The communication infrastructure 240 provides communication between, for example, the processor 210, the one or more transceivers 220, and the memory 250. In some implementations, the communication infrastructure 240 may be a bus.

The processor 210, alone, or together with instructions stored in the memory 250 performs operations enabling system 200 of the system 100 to implement mechanisms for the BFR enhancement for a single DCI mode, as described herein. Alternatively, or additionally, the processor 210 can be "hard coded" to implement mechanisms for the BFR enhancement for a single DCI mode, as described herein The one or more transceivers 220 transmit and receive communications signals support mechanisms for the BFR enhancement for a single DCI mode. Additionally, the one or more transceivers 220 transmit and receive communications signals that support mechanisms for measuring communication link(s), generating and transmitting system information, and receiving the system information. According to some aspects, the one or more transceivers 220 may be coupled to antenna 260 to wirelessly transmit and receive the communication signals. Antenna 260 may include one or more antennas that may be the same or different types. The one or more transceivers 220 allow system 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, or other releases of 3GPP standard.

As discussed in more detail below with respect to FIGS. 3-9, processor 210 may implement different mechanisms for the TRP specific BFR as discussed with respect to the system 100 of FIG. 1.

Figure 3:
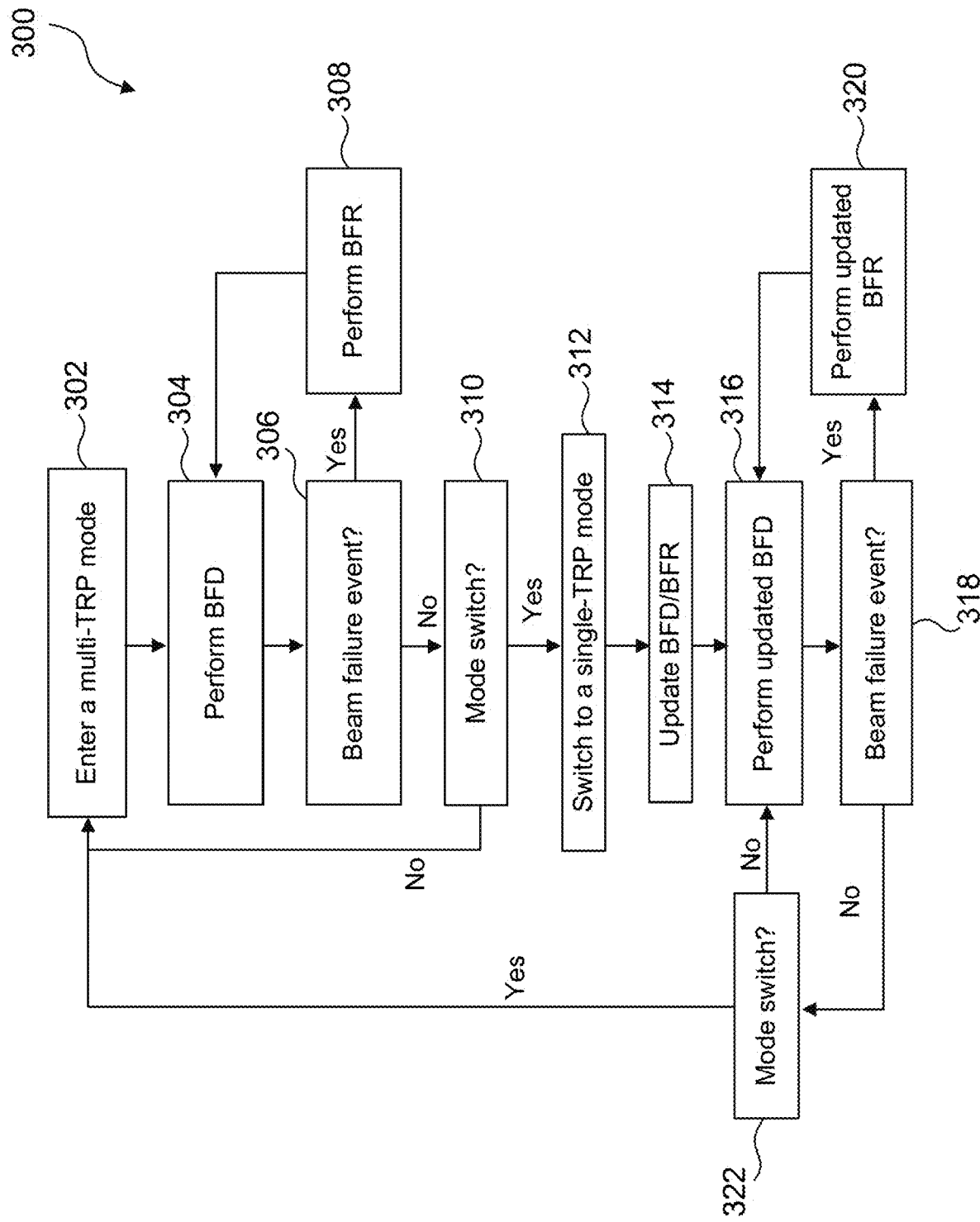
FIG. 3 illustrates an example method for beam failure detection (BFD) and beam failure recovery (BFR) procedures when switching between a multi-TRP mode and a single-TRP mode, according to aspects of the disclosure.

FIG. 3 illustrates an example method 300 for BFD and BFR procedures when switching between a multi-TRP mode and a single-TRP mode. As a convenience and not a limitation, FIG. 3 may be described with regard to elements of FIGS. 1, 2, and 9. Method 300 may represent the operation of electronic devices (for example, the UE 102 and the TRPs 104, 106, and 108 of FIG. 1) implementing the BFD and BFR procedures. The example method 300 may also be performed by system 200 of FIG. 2, controlled or implemented by processor 210, and/or computer system 900 of FIG. 9. But method 300 is not limited to the specific aspects depicted in those figures and other systems may be used to perform the method, as will be understood by those skilled in the art. It is to be appreciated that not all operations may be needed, and the operations may not be performed in the same order as shown in FIG. 3.

At 302, the UE 102 connects with the TRP 104 and the TRP 106. Therefore, the UE 102 is in the multi-TRP mode. In some aspects, the UE 102 enters the multi-TRP mode based on requests from applications of the UE 102, such as the application 254 of the FIG. 2. In some aspects, the UE 102 enters the multiple-TRP mode based on instructions from a base station, wherein the base station can be the TRP 104, the TRP 106, or the TRP 108.

At 304, the UE 102 performs a BFD procedure of the TRP 104 and a BFD procedure of the TRP 106. As discussed above, the UE 102 monitors the communication links 110 and 112. For example, the UE 102 monitors the one or more beams of the communication links 110 and the one or more beams of the communication 112.

At 306, the UE 102 determines and declares a beam failure event. For example, the UE 102 declares a beam failure event of the TRP 104 if the one or more beams of the communication link 110 fail. In such a case, the control moves to 308. Similarly, a beam failure event can be declared for TRP 106.

At 308, the UE 102 performs a BFR procedure of the TRP 104. For example, the UE 102 generates a BFRQ of the TRP 104 and transmits the BFRQ of the TRP 104 to the base station. In some aspects, the BFRQ of the TRP 104 identifies one or more new candidate beams for the communication link 110. The UE 102 then receives a BFRR of the TRP 104 from the base station. The BFRR of the TRP 104 identifies one or more confirmed candidate beams. In some aspects, the one or more confirmed candidate beams are different from the one or more new candidate beams. The UE 102, upon receiving the BFRR of the TRP 104, uses the one or more confirmed candidate beams to recover the communication link 110. The control then returns to 304 and the UE 102 continues to monitor the communication links 110 and 112. Similarly, a BFR procedure can be implemented for TRP 106.

Referring back to 306, if the UE 102 does not declare a beam failure event, the control moves to 310.

At 310, the UE 102 determines whether to switch to the single-TRP mode. In some aspects, the UE 102 determines to switch based on instructions from the base station. For example, the base station transmits a configuration message via a MAC CE to the UE 102. In some aspects, the configuration message is in a form of a TCI. For example, the UE 102 may determine that a code-point of the TCI maps to two TCI states and switch to the multi-TRP mode. On the other hand, the UE 102 may determine that the code-point of the TCI maps to one TCI state and switch to the single-TRP mode. In other aspects, the MAC CE includes a switch indicator. For example, the switch indicator is a binary bit that indicates the single-TRP mode or the multi-TRP mode. If the UE 102 determines not to switch to the single-TRP mode, the control moves back to 302. On the other hand, if the UE 102 determines to switch to the single-TRP mode, the control moves to 312.

At 312, the UE 102 drops one TRP to switch to the single-TRP mode, such as the TRP 104, by refraining from communicating user data to and from the TRP. In some aspects, the UE 102 continues to receive RSs from the TRP 104 after dropping the TRP 104. The UE 102 use the RSs received from the TRP 104 to monitor the one or more beams of the communication link 110. In other words, the UE 102 monitors the communication link 110 for future use after dropping the TRP 104. In some aspects, the UE 102 refrains from communicating any data to and from the TRP 104 including the RSs. In such a case, the UE 102 monitors the one or more beams by receiving alternative RSs from a TRP other than the TRP 104, wherein the alternative RSs QCLed with the one or more beams of the communication link 110.

At 314, the UE 102 updates BFD and BFR procedures. In some aspects, the UE 102 updates the BFD procedure of the TRP 104 and the TRP 106 to one of five BFD options disclosed below.

BFD option 1: the UE 102 stops the BFD procedure of the TRP 104 and resets a BFD counter of the TRP 104. In other words, the UE 102 stops monitoring the communication link 110 when the TRP 104 is dropped. In some aspects, the UE 102 declares a bean failure event based on the BFD counter of the TRP 104. For example, the BFD counter of the TRP 104 includes a number of failures for each of the one or more beams of the communication link 110. The number of failures of a beam increases by 1 when the UE 102 detects a failure of the beam. When the number of failures of the beam reaches a predetermined failure threshold, the UE 102 determines that the beam fails. As discussed above, the UE 102 declares the beam failure event of the TRP 104 when all of the one or more beams of the communication link 110 fail. In such a case, each of the one or more beams has reached the predetermined failure threshold. Therefore, the UE 102 erases records of the one or more beams of the communication link 110 when dropping the TRP 104.

BFD option 2: the UE 102 stops the BFD procedure of the TRP 104 but keeps the BFD counter of the TRP 104. Therefore, the UE 102 stops monitoring the communication link 110. However, the UE 102 can use the BFD counter of the TRP 104 when the UE 102 switches back to the multi-TRP mode.

BFD option 3: the UE 102 continues the BFD procedure of the TRP 104 but pauses the BFRQ of the TRP 104. For example, the UE 102 continues to monitor the communication link 110 and may declare the beam failure event of the TRP 104 if the one or more beams of the communication link 110 fail. However, the UE 102 does not generate or transmit the BFRQ of the TRP 104. The UE 102 generates and transmits the BFRQ of the TRP 104 when switching back to the multi-TRP mode. In other words, the UE 102 holds the BFRQ procedure of the TRP 104 until the UE 102 switches back to the multi-TRP mode.

BFD option 4: the UE 102 continues the BFD procedure of the TRP 104 with no restriction on the BFRQ procedure of the TRP 104. For example, the UE 102 continues to monitor the communication link 110 and triggers the BFRQ of the TRP 104 to initiate the BFR procedure of the TRP 104 when needed.

BFD option 5: the UE 102 performs the BFD option 3 or the BFD option 4 disclosed above within a first time period after switching to the single-TRP mode. In some aspects, the first time period is a transition period. The UE 102 monitors the communication link 110 in case that the UE 102 switches back to the multi-TRP mode within the transition period. When the first time period expires, the UE 102 performs the BFD option 2 above within a second time period. When the second time period expires, the UE 102 performs the BFD option 1 above. In some aspects, the UE 102 switches back to the multi-TRP mode before the first time period expires. In such a case, the UE 102 can update the first time period to be a remaining time of the first time period. Similarly, the UE 102 can update the second time period to be a remaining time of the second time period if the UE 102 switches back to the multi-TRP mode before the second time period expires.

In some aspects, the UE 102 updates the BFD procedure of the TRP 104 as instructed by the base station. For example, the base station transmits a BFD configuration to the UE 102. The BFD configuration indicates a selected BFD option. The BFD configuration also includes the first and the second time periods. In some aspects, the base station transmits the BFD configuration via higher layer signaling. For example, the base station transmits the BFD configuration via an RRC signaling or a MAC CE. In some aspects, the MAC CE includes a field for TCI activation to indicate the selected BFD option. The UE 102 can also determine the selected BFD option based on whether the TCI states of CORESETs change after switching to the single-TRP mode. For example, a CORESET corresponds to the TRP 104. After the UE 102 switches to the single-TRP mode by dropping the TRP 104, if a TCI state of the CORESET changes, the UE 102 selects the BFD option 1. If the TCI state of the CORESET does not change, the UE 102 selects the BFD option 4. In some aspects, the base station can transmit the BFD configuration via DCI that indicates the selected BFD option. For example, the DCI can be format 1_1 DCI or format 1_2 DCI that includes a field to indicate the selected BFD option.

In some aspects, the UE 102 updates the BFD procedure of the TRP 106 to be the same as the BFD procedure of the TRP 104. In other aspects, the UE 102 updates the BFD procedure of the TRP 106 similarly as the BFD procedure of the TRP 104 as disclosed above. For example, the BFD configuration includes the selected BFD of the TRP 104 and a selected BFD option of the TRP 106. In some aspects, the BFD configuration can set the first and the second time periods, disclosed in the BFD option 5 above, of the TRP 106 to be different from those of the TRP 104. In some aspects, the UE 102 can report to the base station a maximum duration of the first and the second time periods it supports.

In some aspects, the UE 102 updates the BFR procedure of the TRP 104 to one of four BFR options disclosed below.

BFR option 1: the UE 102 stops the BFR procedure of the TRP 104. If the UE 102 has initiated the BFR procedure of the TRP 104 before switching to the single-TRP mode, the UE 102 terminates the BFR procedure of the TRP 104 and considers the BFR procedure of the TRP 104 complete. For example, the UE 102 has transmitted the BFRQ of the TRP 104 to the base station before switching to the single-TRP mode, the UE 102 ignores the BFRR of the TRP 104 received from the base station.

BFR option 2: the UE 102 partially stops the BFR procedure of the TRP 104. For example, if the UE 102 has transmitted the BFRQ of the TRP 104 to the base station before switching to the single-TRP mode, the UE 102 processes the BFRR of the TRP 104 received from the base station. However, the UE 102 does not transmit any additional BFRQs of the TRP 104 before switching back to the multi-TRP mode. For example, the UE 102 does not retransmit the BFRQ of the TRP 104 if the UE 102 does not receive the BFRR of the TRP 104 from the base station within a predetermined retransmission time period.

BFR option 3: the UE 102 continues the BFR procedure of the TRP 104. For example, the UE 102 transmits the BFRQ of the TRP 104 to the base station after the UE 102 declares the beam failure event of the TRP 104. The UE 102 retransmits the BFRQ of the TRP 104 if the UE 102 does not receive the BFRR of the TRP 104 from the base station within the predetermined retransmission time period.

BFR option 4: the UE 102 performs the BFR option 2 or the BFR option 3 disclosed above within a third time period after switching to the single-TRP mode. When the third time period expires, the UE 102 performs the BFR option 1 disclosed above.

In some aspects, the UE 102 updates the BFR procedure of the TRP 104 as instructed by the base station. For example, the base station transmits a BFR configuration to the UE 102. The BFR configuration indicates a selected BFR option. In some aspects, the BFR configuration also indicates, when selecting the BFR option 4, whether to perform the BFR option 2 or the BFR option 3 within the third time period. The BFR configuration also includes the third time period. In some aspects, the base station transmits the BFR configuration via the higher layer signaling. For example, the base station transmits the BFR configuration via the RRC signaling or the MAC CE. In some aspects, the MAC CE includes a field for TCI activation to indicate the selected BFR option. The UE 102 can also determine the selected BFR option based on whether the TCI states of CORESETs change after switching to the single-TRP mode. For example, a CORESET corresponds to the TRP 104. After the UE 102 switches to the single-TRP mode by dropping the TRP 104, if a TCI state of the CORESET changes, the UE 102 selects the BFR option 1. If the TCI state of the CORESET does not change, the UE 102 selects the BFR option 3. In some aspects, the base station can transmit the BFR configuration via DCI that indicates the selected BFR option. For example, the DCI can be format 1_1 DCI or format 1_2 DCI that includes a field to indicate the selected BFR option.

In some aspects, the UE 102 updates the BFR procedure of the TRP 106 to be the same as the BFR procedure of the TRP 104. In other aspects, the UE 102 updates the BFR procedure of the TRP 106 similarly as the BFR procedure of the TRP 104 disclosed above. For example, the BFR configuration includes the selected BFR of the TRP 104 and a selected BFR option of the TRP 106. In some aspects, the BFR configuration can set the third time period, disclosed in the BFR option 4 above, of the TRP 106 to be different from that of the TRP 104. In some aspects, the UE 102 can report to the base station a maximum duration of the third time period it supports.

At 316, the UE 102 performs the updated BFD procedure of the TRP 104 and the updated BFD procedure of the TRP 106. The control may move to 322 directed based on the selected BFD option. For example, if the updated BFD procedures of the TRP 104 and the updated BFD procedure of the TRP 106 correspond to the BFD option 1 or the BFD option 2, the control moves to 322 directly because the UE 102 would not declare a beam failure event in this case. Otherwise, the control moves to 318.

At 318, the UE 102 determines whether there is a beam failure event based on the updated BFD procedures of the TRP 104 and the updated BFD procedure of the TRP 106. If the UE 102 declares a beam failure event of the TRP 104 or the TRP 106, the control moves to 320. Otherwise, the control moves to 322.

At 320, the UE 102 performs the updated BFR procedures of the TRP 104 or the TRP 106. For example, if the UE 102 declares the beam failure event of the TRP 104 at 318, the UE 102 performs the updated BFR procedure of the TRP 104 to recover the communication link 110. The control then moves back to 316.

At 322, the UE 102 determines whether to switch back to the multi-TRP mode. Similar to 310, the UE 102 determines to switch based on instructions from the base station. If the UE 102 determines to switch, the control moves to 302. Otherwise, the control moves to 316.

Figure 4:
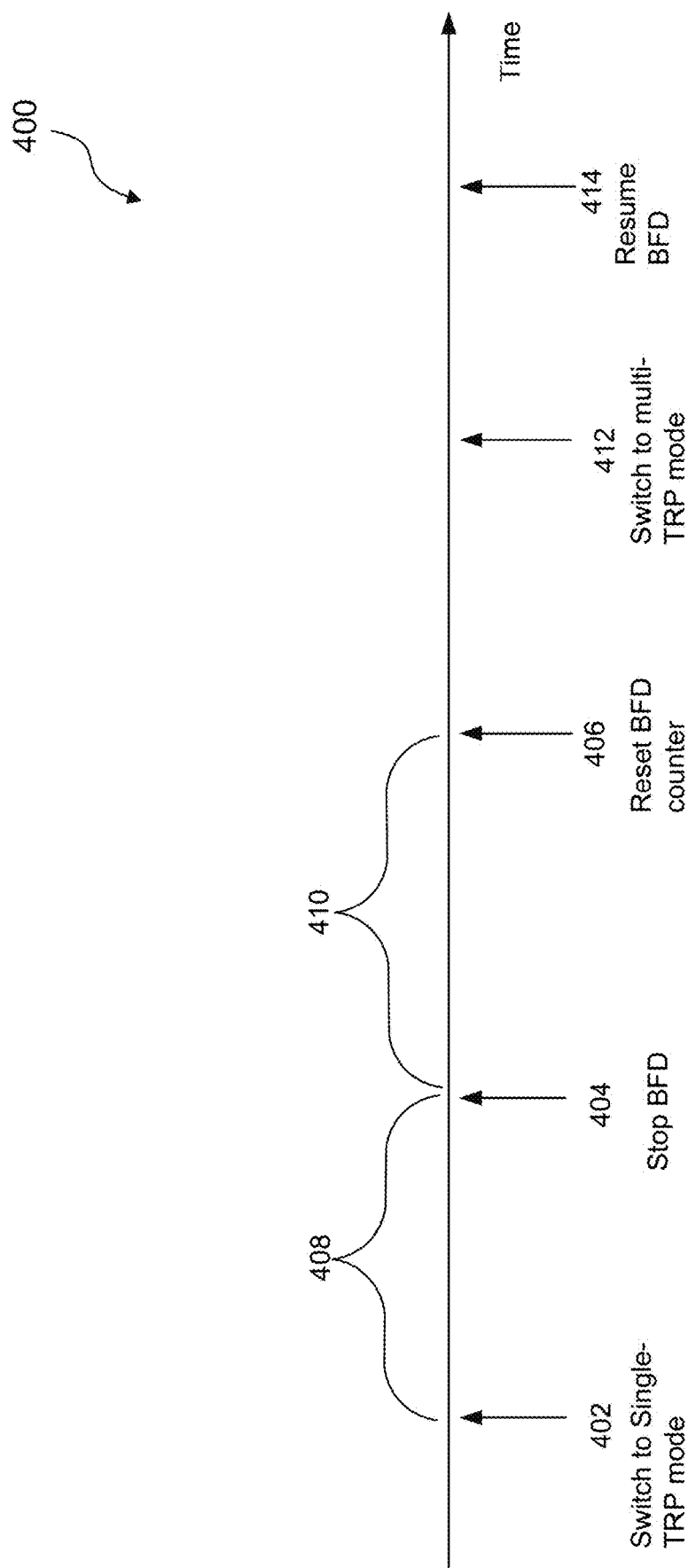
FIG. 4 illustrates an example method for an updated BFD procedure, according to aspects of the disclosure.

FIG. 4 illustrates an example method for an updated BFD procedure. As a convenience and not a limitation, FIG. 4 may be described with regard to elements of FIGS. 1, 2, and 9. Method 400 may represent the operation of electronic devices (for example, the UE 102 and the TRPs 104, 106, and 108 of FIG. 1) implementing the BFD procedure. The example method 400 may also be performed by system 200 of FIG. 2, controlled or implemented by processor 210, and/or computer system 900 of FIG. 9. But method 400 is not limited to the specific aspects depicted in those figures and other systems may be used to perform the method, as will be understood by those skilled in the art. It is to be appreciated that not all operations may be needed, and the operations may not be performed in the same order as shown in FIG. 4. In some aspects, the method 400 describes details of the BFD option 5 of 314 in FIG. 3.

At 402, the UE 102 switches to the single-TRP mode by dropping one TRP, such as the TRP 104. In some aspects, the UE 102 switches to the single-TRP mode based on instructions received from the base station. For example, the base station transmits the MAC CE to the UE 102 to instruct the UE 102 to switch to the single-TRP mode. The UE 102 continues to monitor the one or more beams of the communication link 110.

At 404, the UE 102 stops a BFD procedure, such as the BFD procedure of the TRP 104. In some aspects, the UE 102 continues to monitor the one or more beams of the communication link 110 during a first time period 408, which is also referred to as a BFD transitional period. In some aspects, a length of the first time period 408 is predetermined. In other aspects, the base station can configure the length of the first time period 408 by transmitting a BFD configuration to the UE 102. The UE 102 may also adjust the length of the first time period 408 based on requests received from applications of the UE 102, such as the application 254 of the FIG. 2.

At 406, the UE 102 resets a BFD counter of the TRP 104 after a second time period 410. In some aspects, a length of the second time period 410 is predetermined. In other aspects, the base station can configure the length of the second time period 410 by transmitting a BFD configuration to the UE 102. The UE 102 may also adjust the length of the second time period 410 based on requests received from applications of the UE 102, such as the application 254 of the FIG. 2.

At 412, the UE 102 switches back to the multi-TRP mode. At 414, the UE 102 resumes the BFD procedure of the TRP 104. In some aspects, 412 co-locates with 414. In other words, the UE 102 resumes the BFD procedure of the TRP 104 when switching back to the multi-TRP mode. In some aspects, 412 can be triggered any time after 402. For example, 412 can be triggered after 402 and before 404. In such a case, the UE 102 does not stop the BFD procedure of the TRP 104 because the UE 102 would be in the BFD transitional period 408 before switching back to the multi-TRP mode. Furthermore, 404 and 406 would not be triggered. 412 can also be triggered after 404 and before 406. In such a case, 406 would not be triggered. In other words, the UE 102 would not rest the BFD counter. In such a case, 414 can use the BFD counter that includes information before 402. For example, the UE 102 determines that a beam fails if the UE 102 detects that a BLER corresponding to the beam falls below a threshold 10 times. The UE 102 detects that the BLER corresponding to the beam falls below the threshold 9 times before 402. In such as case, after switching back to the multi-TRP mode, the UE 102 would determine that the beam fails if the UE 102 detects that the BLER corresponding to the beam falls below the threshold once.

Figure 5:
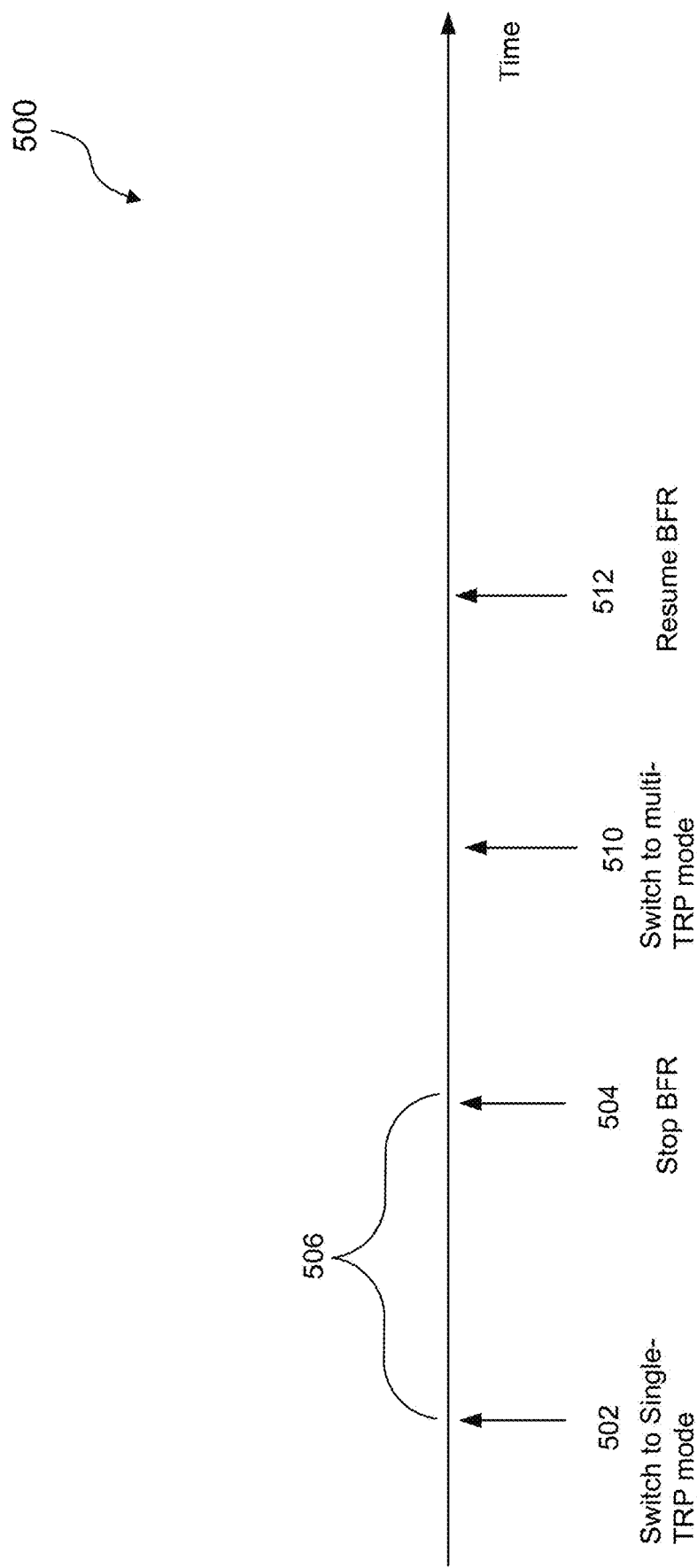
FIG. 5 illustrates an example method for an updated BFR procedure, according to aspects of the disclosure.

FIG. 5 illustrates an example method for an updated BFR procedure. As a convenience and not a limitation, FIG. 5 may be described with regard to elements of FIGS. 1, 2, and 9. Method 500 may represent the operation of electronic devices (for example, the UE 102 and the TRPs 104, 106, and 108 of FIG. 1) implementing the BFD procedure. The example method 500 may also be performed by system 200 of FIG. 2, controlled or implemented by processor 210, and/or computer system 900 of FIG. 9. But method 500 is not limited to the specific aspects depicted in those figures and other systems may be used to perform the method, as will be understood by those skilled in the art. It is to be appreciated that not all operations may be needed, and the operations may not be performed in the same order as shown in FIG. 5. In some aspects, the method 500 describes details of the BFR option 4 of 314 in FIG. 3.

At 502, the UE 102 switches to the single-TRP mode by dropping one TRP, such as the TRP 104. In some aspects, the UE 102 switches to the single-TRP mode based on instructions received from the base station. For example, the base station transmits the MAC CE to the UE 102 to instruct the UE 102 to switch to the single-TRP mode. The UE 102 continues to monitor the one or more beams of the communication link 110.

At 504, the UE 102 stops a BFD procedure, such as the BFD procedure of the TRP 104. In some aspects, the UE 102 continues to perform the BFR procedure of the TRP 104 during a third time period 506, which is also referred to as a BFR transitional period. In some aspects, a length of the third time period 506 is predetermined. In other aspects, the base station can configure the length of the third time period 506 by transmitting a BFR configuration to the UE 102. The UE 102 may also adjust the length of the third time period 506 based on requests received from the applications of the UE 102, such as the application 254 of the FIG. 2. In some aspects, the UE 102 initiates the BFR procedure of the TRP 104 before 504, the UE 102 terminates the BFR procedure of the TRP 104 at 504. For example, before 504, the UE 102 transmits a BFRQ of the TRP 104 to the base station but does not receive a BFRR of the TRP 104 from the base station before 504. The UE 102 terminates the BFR procedure of the TRP 104 and disregards the BFRR of the TRP 104 received after 504.

At 510, the UE 102 switches back to the multi-TRP mode. At 512, the UE 102 resumes the BFR procedure of the TRP 104. In some aspects, 510 co-locates with 512. In other words, the UE 102 resumes the BFR procedure of the TRP 104 when switching back to the multi-TRP mode. In some aspects, 510 can be triggered any time after 502. For example, 510 can be triggered after 502 and before 504. In such a case, the UE 102 continues the BFR procedure of the TRP 104 if it is initiated before 510. For example, before 510, the UE 102 initiates the BFR procedure of the TRP 104 by transmitting the BFRQ of the TRP 104 to the base station, but does not receive the BFRR of the TRP 104. The UE 102 waits until a predetermined retransmission time period expires to retransmit the BFRQ of the TRP 104.

Figure 6:
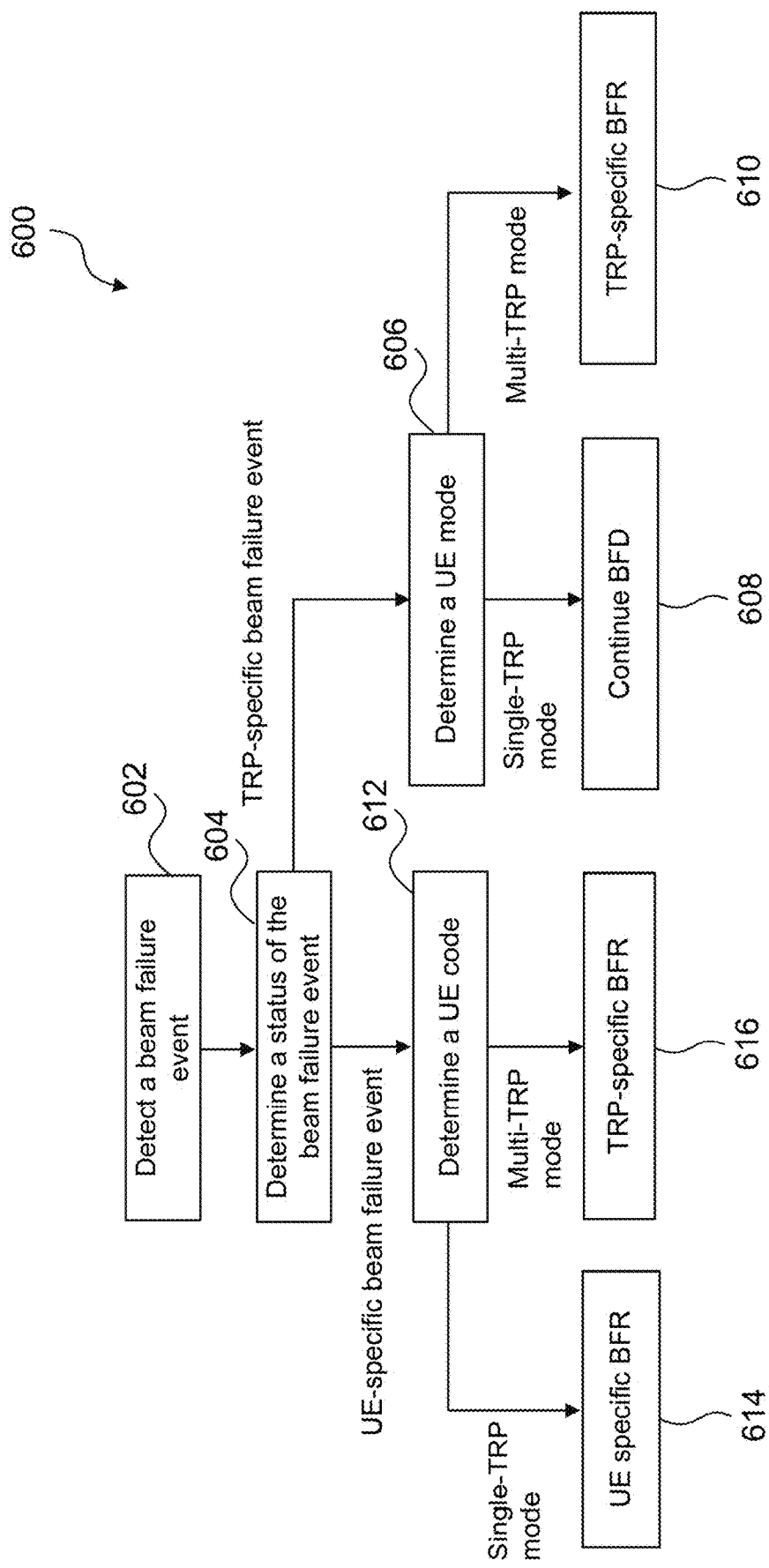
FIG. 6 illustrates an example method for coexistence of UE-specific BFR and TRP-specific BFR for a beam failure event, according to aspects of the disclosure.

FIG. 6 illustrates an example method for coexistence of UE-specific BFR and TRP-specific BFR for a beam failure event. As a convenience and not a limitation, FIG. 6 may be described with regard to elements of FIGS. 1, 2, and 9. Method 600 may represent the operation of electronic devices (for example, the UE 102 and the TRPs 104, 106, and 108 of FIG. 1) implementing the BFD procedure. The example method 600 may also be performed by system 200 of FIG. 2, controlled or implemented by processor 210, and/or computer system 900 of FIG. 9. But method 600 is not limited to the specific aspects depicted in those figures and other systems may be used to perform the method, as will be understood by those skilled in the art. It is to be appreciated that not all operations may be needed, and the operations may not be performed in the same order as shown in FIG. 6.

At 602, the UE 102 detects a beam failure event. In some aspects, the UE 102 performs a UE-specific BFD procedure and a TRP-specific BFD procedure because the UE 102 is in both the TRP-specific mode and the UE-specific mode. Therefore, the UE 102 detects the beam failure event based on either the UE-specific BFD procedure or the TRP-specific BFD procedure.

At 604, the UE 102 determines a status of the beam failure event. In some aspects, the UE 102 determines that the beam failure event is a TRP-specific beam failure event if the beam failure event indicates that one or more beams of a TRP fail, e.g., the one or more beams of the communication link 110. In such a case, the control moves to 606. The UE 102 determines that the beam failure event is a UE-specific beam failure event if the beam failure event indicates that all beams corresponding to the UE 102 fail. In such a case, the control moves to 612.

At 606, the UE 102 determines whether the UE 102 is in the single-TRP mode or the multi-TRP mode. In some aspects, upon determining the single-TRP mode, the UE 102 also determines whether the UE 102 is in the BFD transition period. If the UE 102 is in the single-TRP mode, the control moves to 608. Otherwise, the control moves to 610.

At 608, the UE 102 ignores the beam failure event and continues a BFD procedure, such as the BFD procedure of the TRP 104. For example, the TRP 104 is dropped and the beam failure event indicates that the one or more beams of the communication link 110 fail. In such a case, the UE 102 continues the BFD procedure of the TRP 104. In some aspects, the UE 102 resets the BFD counter of the TRP 104. In some aspects, the UE 102 ignores the beam failure event and stops the BFD procedure if the UE 102 detects the beam failure event after the BFD transition period.

At 610, the UE 102 performs a TRP-specific BFR corresponding to the beam failure event. For example, the beam failure event corresponds to the TRP 104. The UE 102 performs the BFR procedure of the TRP 104 to recover the communication link 110.

At 612, the UE determines whether the UE 102 is in the single-TRP mode or the multi-TRP mode similarly as disclosed in 606. The control moves to 614 if the UE 102 is in the single-TRP mode. Otherwise, the control moves to 616. In some aspects, the UE 102 determines to perform a UE-specific BFR or a TRP-specific BFR based on instructions from the base station. For example, the base station transmits a configuration message to the UE 102 via an RRC signaling, a MAC CE, or DCI. If the configuration message indicates the UE 102 to select the UE-specific BFR, the control moves to 614. If the configuration message indicates the UE 102 to select the TRP-specific BFR, the control moves to 616.

At 614, the UE 102 performs a UE-specific BFR. As disclosed above, the UE-specific BFR recovers at least one beam of the UE 102. For example, the TRP 104 is dropped. The UE 102 may recover a beam of the communication link 112 to recover the communication link 112.

At 616, the UE 102 performs the TRP-specific BFR. For example, the UE 102 generates and transmits both the BFRQ of the TRP 104 and the BFRQ of the TRP 106. Upon receiving the BFRRs of the TRP 104 and the TRP 106, the UE 102 recovers the communication links 110 and 112. In some aspects, the UE 102 performs the TRP-specific BFR based on instructions of the baes station. For example, the UE 102 generates a multiple BFR capability report and transmits the multiple BFR capability report to the base station. The multiple BFR capability report indicates that the UE 102 is capable of generating and transmitting more than one BFRQs. The base station then transmits a multiple BFR configuration to the UE 102 to allow the UE 102 to generate and transmit more than one BFRQs. In some aspects, the UE 102 can generate and transmit more than one BFRQs after transmitting the multiple BFR capability report to the base station without receiving the multiple BFR configuration from the base station.

Figure 7:
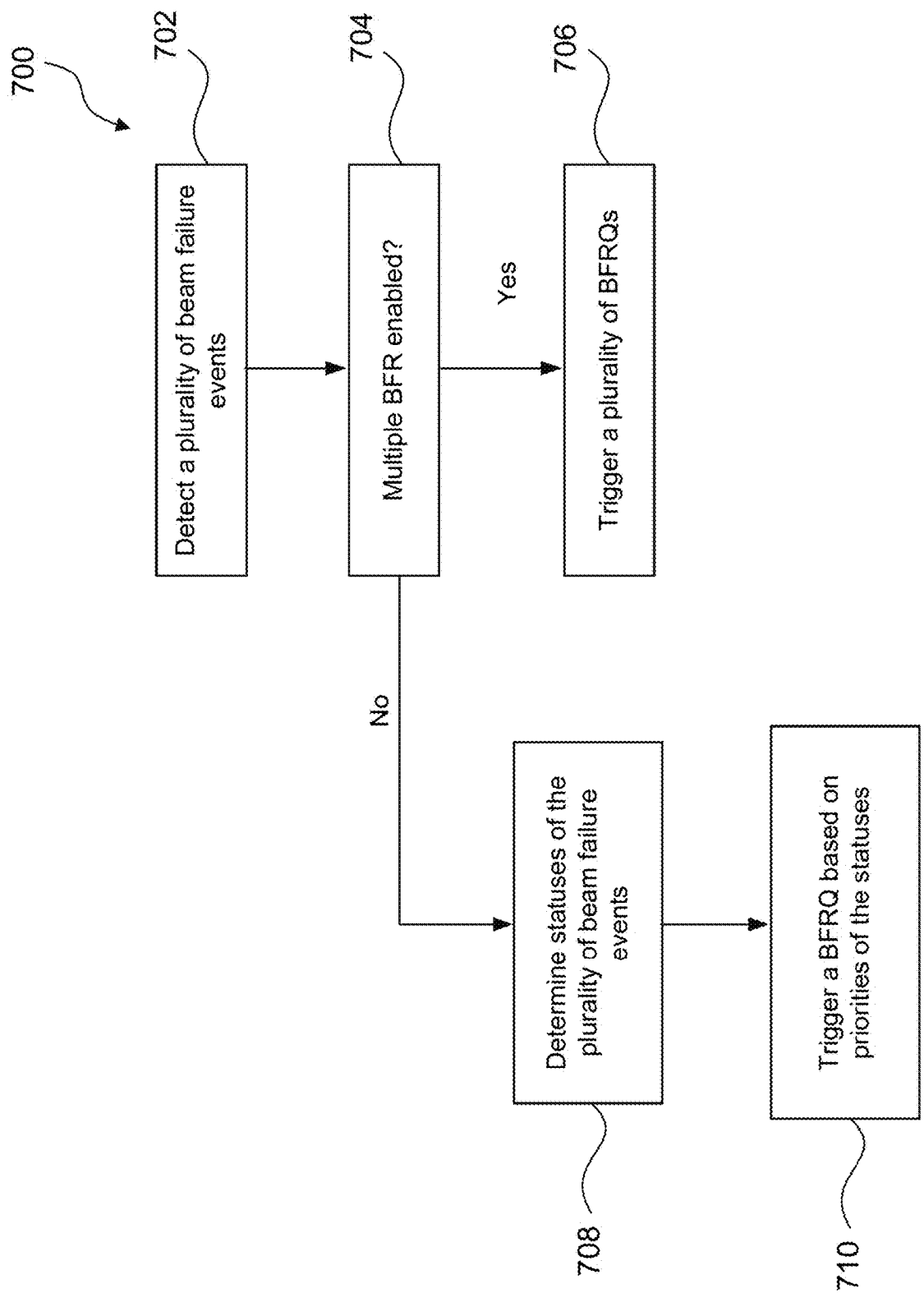
FIG. 7 illustrates an example method for the coexistence of the UE-specific BFR and the TRP-specific BFR for a plurality of beam failure events, according to aspects of the disclosure.

FIG. 7 illustrates an example method for the coexistence of the UE-specific BFR and the TRP-specific BFR for a plurality of beam failure events. As a convenience and not a limitation, FIG. 7 may be described with regard to elements of FIGS. 1, 2, and 9. Method 700 may represent the operation of electronic devices (for example, the UE 102 and the TRPs 104, 106, and 108 of FIG. 1) implementing the BFD procedure. The example method 700 may also be performed by system 200 of FIG. 2, controlled or implemented by processor 210, and/or computer system 900 of FIG. 9. But method 700 is not limited to the specific aspects depicted in those figures and other systems may be used to perform the method, as will be understood by those skilled in the art. It is to be appreciated that not all operations may be needed, and the operations may not be performed in the same order as shown in FIG. 7.

At 702, the UE 102 detects a plurality of beam failure events. In some aspects, the UE 102 performs the UE-specific BFD procedure and the TRP-specific BFD procedure because the UE 102 is in both the TRP-specific mode and the UE-specific mode. In addition, the UE 102 uses different sets of RSs for the UE-specific BFD procedure and the TRP-specific BFD procedure. Therefore, the UE 102 may detect the plurality of beam failure events at the same time based on the UE-specific BFD procedure and the TRP-specific BFD procedure.

At 704, the UE 102 determines if a multiple BFR procedure is enabled. Similar to discussed above, the UE 102 enables the multiple BFR procedure by transmitting the multiple BFR capability report to the base station and receiving the multiple BFR configuration from the base station. In some aspects, the UE 102 enables the multiple BFR procedures by transmitting the multiple BFR capability report to the base station without receiving the multiple BFR configuration from the base station. If the multiple BFR procedure is enabled, the control moves to 706. Otherwise, the control moves to 708.

At 706, the UE 102 triggers a plurality of BFRQs corresponding to the plurality of beam failure events. In some aspects, the UE 102 processes a plurality of BFRRs corresponding to the plurality of BFRQs to recover one or more communication links, such as the communication links 110 and 112.

At 708, the UE 102 determines statuses of the plurality of beam failure events. For example, the plurality of beam failure events include a first, a second, and a third beam failure events. The UE 102 determines the first beam failure event to be an event of the TRP 104 if the first beam failure event indicates that the one or more beams of the communication link 110 fail. The UE 102 also determines the second beam failure event to be an event of the TRP 106 if the second beam failure event indicates that the one or more beams of the communication link 112 fail and the third beam failure event to an event of the UE 102 if the third beam failure event indicates that all beams of the UE 102 fail.

At 710, the UE 102 triggers a BFRQ procedure corresponding to one of the plurality of beam failure events based on their priorities. For example, the third beam failure event has a high priority; the first beam failure event has a medium priority; and the second beam failure event has a low priority. Therefore, when the UE 102 detects the first, the second, and the third beam failure events, the UE 102 triggers the BFRQ of the UE 102, which corresponds to the third beam failure event. Similarly, if the UE 102 detects the first and the second beam failure events, the UE 102 triggers the BFRQ of the TRP 104. In some aspects, the priorities of the first, the second, and the third beam failure events are configured by the base station. For example, the configuration message transmitted by the base station indicates the priorities of the first, the second, and the third beam failure events.

Figure 8:
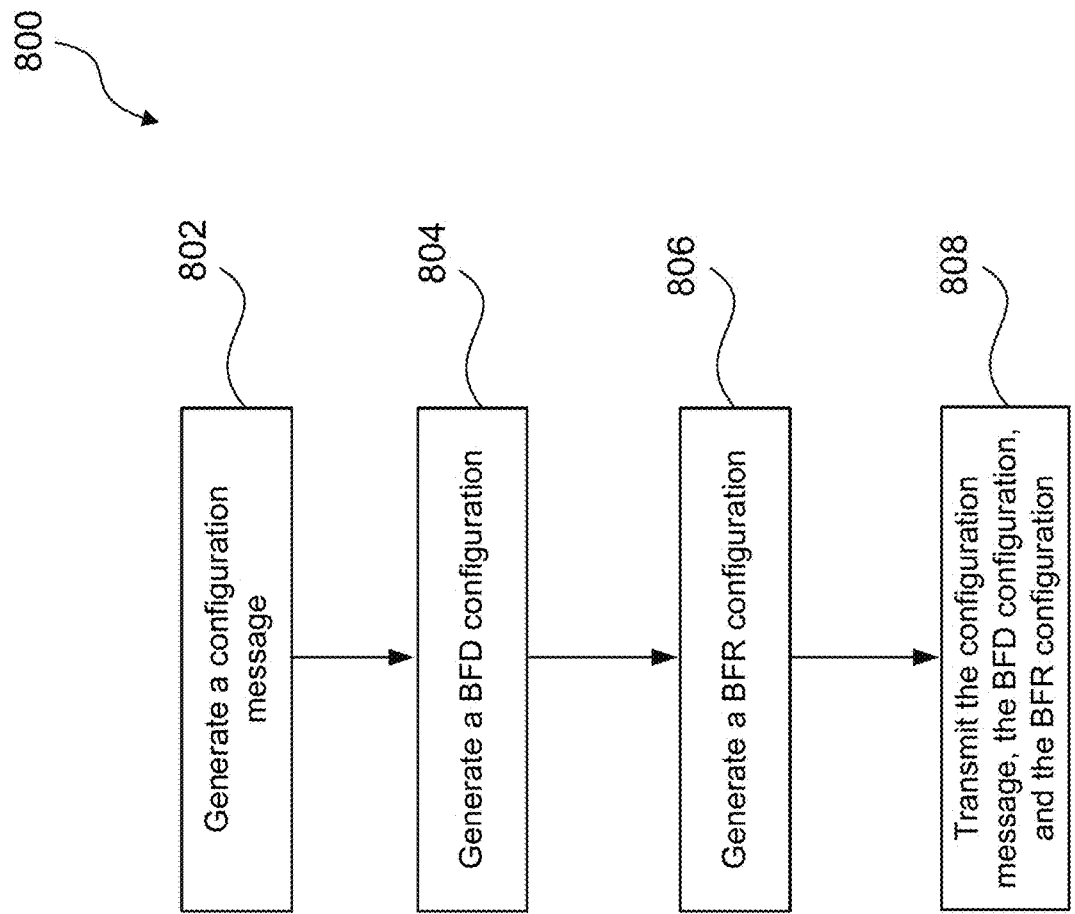
FIG. 8 illustrates an example method for a base station configuring the TRP-specific BFR, according to aspects of the disclosure.

FIG. 8 illustrates an example method for the base station configuring the TRP-specific BFR. As a convenience and not a limitation, FIG. 8 may be described with regard to elements of FIGS. 1, 2, and 9. Method 800 may represent the operation of electronic devices (for example, the TRPs 104, 106, and 108 of FIG. 1) configuring the TRP-specific BFR. The example method 800 may also be performed by system 200 of FIG. 2, controlled or implemented by processor 210, and/or computer system 900 of FIG. 9. But method 800 is not limited to the specific aspects depicted in those figures and other systems may be used to perform the method, as will be understood by those skilled in the art. It is to be appreciated that not all operations may be needed, and the operations may not be performed in the same order as shown in FIG. 8.

At 802, the base station generates a configuration message. In some aspects, the configuration message instructs the UE 102 to be in the multi-TRP mode or the single-TRP mode. For example, if the configuration message indicates the single-TRP mode and the UE 102 is in the multi-TRP mode. The UE 102, upon receiving the configuration message, switches from the multi-TRP mode to the single-TRP mode.

At 804, the base station generates a BFD configuration. In some aspects, the BFD configuration indicates a selected BFD option as disclosed in FIG. 3. For example, if the BFD configuration indicates the BFD option 5 to be the selected BFD option, the UE 102, upon receiving the BFD configuration, updates the BFD procedure based on the BFD option 5. In some aspects, the BFD configuration also includes the lengths of the first and the second time periods of the BFD option 5 disclosed in FIG. 3.

At 806, the base station generates a BFR configuration. In some aspects, the BFR configuration indicates a selected BFR option as disclosed in FIG. 3. For example, if the BFR configuration indicates the BFR option 4 to be the selected BFR option, the UE 102, upon receiving the BFR configuration, updates the BFR procedure based on the BFR option 4. In some aspects, the BFR configuration also includes the length of the third time period of the BFR option 4 disclosed in FIG. 3.

At 808, the base station transmits the configuration message, the BFD configuration, and the BFR configuration to the UE 102. In some aspects, the base station transmits the configuration message, the BFD configuration, and the BFR configuration via a radio resource control (RRC) signaling, a MAC Control Element (MAC CE), or downlink control information (DCI). In some aspects, the base station transmits the BFD configuration and the BFR configuration before transmitting the configuration message.

Figure 9:
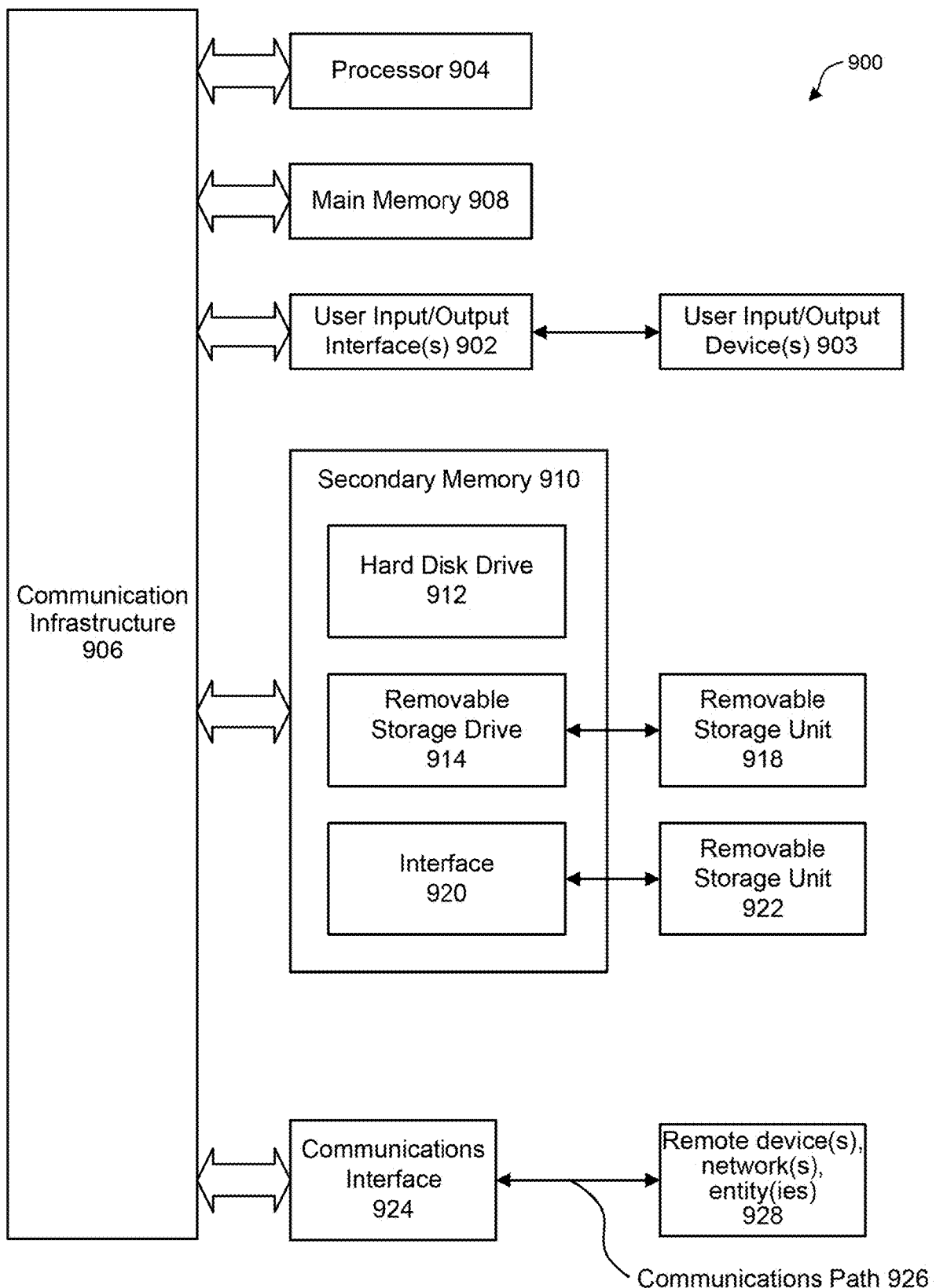
FIG. 9 is an example computer system for implementing some aspects of the disclosure or portion(s) thereof.

Various aspects may be implemented, for example, using one or more computer systems, such as computer system 900 shown in FIG. 9. Computer system 900 may be any well-known computer capable of performing the functions described herein such as electronic devices 102, 104, 106, and 108 of FIG. 1, or 200 of FIG. 2. Computer system 900 includes one or more processors (also called central processing units, or CPUs), such as a processor 904. Processor 904 is connected to a communication infrastructure 906 (e.g., a bus.) Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some aspects, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 9. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
a transceiver configured to enable wireless communication with a first transmission/reception point (TRP) and a second TRP; and
a processor communicatively coupled to the transceiver and configured to:
perform a first beam failure detection (BFD) procedure for the first TRP and a second BFD procedure for the second TRP;
perform a first beam failure recovery (BFR) procedure for the first TRP responsive to a result of the first BFD procedure and a second BFR procedure for the second TRP responsive to a result of the second BFD procedure;
receive, using the transceiver, a configuration message indicating a switch for the UE from a multi-TRP mode to a single-TRP mode;
receive, using the transceiver, a BFD configuration and a BFR configuration;
switch to the single-TRP mode based on the configuration message by refraining from communicating user data with the first TRP;
update the first BFD procedure based on the BFD configuration by:
pausing the first BFD procedure when a first time period expires, wherein the first time period begins after switching to the single-TRP mode, wherein the BFD configuration indicates a length of the first time period; and
resetting a BFD counter when a second time period expires, wherein the second time period begins after pausing the first BFD procedure, wherein the BFD configuration indicates a length of the second time period;
update the first BFR procedure based on the BFR configuration by:
pausing the first BFR procedure when a third time period expires, wherein the third time period begins after switching to the single-TRP mode, wherein the BFR configuration indicates a length of the third time period;

perform the updated first BFD procedure for the first TRP;

perform the updated first BFR procedure for the first TRP responsive to a result of the updated first BFD procedure;

update the second BFD procedure based on the BFD configuration and update the second BFR procedure based on the BFR configuration;

perform the updated second BFD procedure for the second TRP; and perform the updated second BFR procedure for the second TRP responsive to a result of the updated second BFD procedure.

2. The UE of claim 1, wherein the processor is configured to receive the BFD configuration and the BFR configuration by receiving a radio resource control (RRC) signaling, a MAC Control Element (MAC CE), or downlink control information (DCI).

3. The UE of claim 1, wherein the processor is configured to update the first BFD procedure by:

pausing the first BFD procedure and resetting the BFD counter;

pausing the first BFD procedure and continuing the BFD counter;

continuing the first BFD procedure and pausing a beam failure recovery request (BFRQ); or continuing the first BFD procedure.

4. The UE of claim 1, wherein the processor is configured to update the first BFR procedure by:

pausing the first BFR procedure;

continuing the first BFR procedure and pausing a beam failure recovery request (BFRQ); or continuing the first BFR procedure.

5. The UE of claim 1, wherein the processor is configured to perform the first BFD procedure for the first TRP by:

detecting one or more block error rates (BLERs) of one or more reference signals, wherein the one or more reference signals include at least one of synchronization signal block (SSB) signals or channel state information reference signals (CSI-RSs); and determining one or more beam failure events based on the one or more BLERs.

6. The UE of claim 1, wherein the processor is further configured to:

determine a beam failure event based on the first and the second BFD procedures;

determine a status of the beam failure event, wherein the status of the beam failure event includes a UE-specific beam failure event or a TRP-specific beam failure event; and perform a BFR procedure based on the status of the beam failure event.

7. The UE of claim 6, wherein the processor is further configured to:

determine that the status of the beam failure event indicates the TRP-specific beam failure event corresponding to the second TRP;

determine that the UE is in the multi-TRP mode; and perform the second BFR procedure for the second TRP.

8. The UE of claim 6, wherein the processor is further configured to:

determine that the status of the beam failure event indicates the UE-specific beam failure event; and trigger TRP-specific beam failure recovery requests (BFRQs) for the first and the second TRPs or a UE-specific BFRQ based on whether the UE is in the multi-TRP mode or the single TRP mode.

9. The UE of claim 1, wherein the processor is further configured to:

determine a plurality of beam failure events based on the first and the second BFD procedures;

determine corresponding statuses of the beam failure events, wherein the corresponding statuses of the beam failure events include a UE-specific beam failure event, a first TRP-specific beam failure event corresponding to the first TRP, or a second TRP-specific beam failure event corresponding to the second TRP; and trigger a beam failure recovery request (BFRQ) based on priorities of the corresponding statuses of the beam failure events.

10. The UE of claim 1, wherein the processor is further configured to:

generate a multiple BFR capability report;

transmit, using the transceiver, the multiple BFR capability report to a base station;

receive, using the transceiver, a multiple BFR configuration from the base station;

determine a plurality of beam failure events based on the first and the second BFD procedures; and trigger a plurality of beam failure recovery requests (BFRQs) based on the plurality of beam failure events.

11. A method of operating a user equipment (UE) to communicate with a first transmission/reception point (TRP) and a second TRP, the method comprising:

performing a first beam failure detection (BFD) procedure for the first TRP and a second BFD procedure for the second TRP;

performing a first beam failure recovery (BFR) procedure for the first TRP responsive to a result of the first BFD procedure and a second BFR procedure for the second TRP responsive to a result of the second BFD procedure;

receiving a configuration message indicating a switch for the UE from a multi-TRP mode to a single-TRP mode;

receiving a BFD configuration and a BFR configuration;

switching to the single-TRP mode based on the configuration message by refraining from communicating user data with the first TRP;

updating the first BFD procedure based on the BFD configuration by:

pausing the first BFD procedure when a first time period expires, wherein the first time period begins after switching to the single-TRP mode, wherein the BFD configuration indicates a length of the first time period; and resetting a BFD counter when a second time period expires, wherein the second time period begins after pausing the first BFD procedure, wherein the BFD configuration indicates a length of the second time period;

updating the first BFR procedure based on the BFR configuration by:

pausing the first BFR procedure when a third time period expires, wherein the third time period begins after switching to the single-TRP mode, wherein the BFR configuration indicates a length of the third time period;

performing the updated first BFD procedure for the first TRP;

performing the updated first BFR procedure for the first TRP responsive to a result of the updated first BFD procedure;

update the second BFD procedure based on the BFD configuration and update the second BFR procedure based on the BFR configuration;

perform the updated second BFD procedure for the second TRP; and perform the updated second BFR procedure for the second TRP responsive to a result of the updated second BFD procedure.

12. The method of claim 11, wherein the updating the first BFD procedure further comprises:

pausing the first BFD procedure and resetting the BFD counter;

pausing the first BFD procedure and continuing the BFD counter;

continuing the first BFD procedure and pausing a beam failure recovery request (BFRQ); or continuing the first BFD procedure.

13. The method of claim 11, wherein the updating the first BFR procedure further comprises:

pausing the first BFR procedure;

continuing the first BFR procedure and pausing a beam failure recovery request (BFRQ); or continuing the first BFR procedure.

* * * * *